United States Patent [19]

Carlton et al.

[11] Patent Number: 5,662,790
[45] Date of Patent: Sep. 2, 1997

[54] AIR CONTACTOR WITH FOAM SEPARATION VESSEL SYSTEM

[75] Inventors: Keith A. Carlton, Glens Falls, N.Y.; Scott M. Clum, Columbus, Ind.; Joseph R. Phillips, Queensbury, N.Y.; Todd A. Salvato, Adams, Mass.

[73] Assignee: Ahlstrom Machinery Oy, Karhula, Finland

[21] Appl. No.: 539,242

[22] Filed: Oct. 4, 1995

[51] Int. Cl.$^6$ .............................. B03D 1/24; B04C 9/00; B04C 5/00
[52] U.S. Cl. .......................... 269/170; 209/727; 209/730; 209/733; 162/4; 210/221.2
[58] Field of Search ............... 162/4, 5, 6; 209/170, 209/727, 730, 733, 728; 210/512.1, 512.2, 703, 787, 221.2

[56] References Cited

U.S. PATENT DOCUMENTS

| | | | |
|---|---|---|---|
| 2,816,658 | 12/1957 | Braun et al. | 209/732 |
| 3,501,014 | 3/1970 | Fitch et al. | 210/512.1 |
| 3,912,579 | 10/1975 | Braun | 162/4 |
| 4,279,743 | 7/1981 | Miller | 209/731 |
| 4,940,534 | 7/1990 | Harrison | 209/169 |
| 4,971,685 | 11/1990 | Stanley | 209/170 |
| 5,069,751 | 12/1991 | Chamblee et al. | 162/5 |
| 5,094,674 | 3/1992 | Schweiss et al. | 55/178 |
| 5,116,488 | 5/1992 | Torregossa | 209/170 |
| 5,131,980 | 7/1992 | Chamblee et al. | 162/4 |
| 5,173,177 | 12/1992 | Greenwood et al. | 209/170 |
| 5,176,822 | 1/1993 | Iwashige et al. | 209/168 |
| 5,529,190 | 6/1996 | Carlton et al. | 209/170 |

Primary Examiner—Donald E. Czaja
Assistant Examiner—Jose A. Fortuna
Attorney, Agent, or Firm—Nixon & Vanderhye P.C.

[57] ABSTRACT

A deinking system for use with recycled paper pulp includes a number of gas sparged hydrocyclones mounted around the outer periphery of a foam separation vessel, with the slurry outlet from each hydrocyclone introducing slurry into the vessel below the level of liquid in the vessel, and above the accepts outlet from the bottom of the vessel. An annular trough is provided adjacent the top and outer periphery of the vessel, and has a bottom sloping to one or more drain outlets. The hydrocyclone discharge conduits into the vessel are tangential to cause bubble-releasing swirling of the slurry in the vessel. The cyclone preferably is pedestal-less, and has a single gas inlet, and a deflector within the annular air jacket of the hydrocyclone. At least one substantially conical substantially uniform back pressure generator may be disposed in the hydrocyclone slurry outlet, a foam conveyance and breaking device may be associated with the drain outlet from the trough, and a foam and rejects handling tank connected to the foam conveyance and breaking device and including a substantially spiral downwardly extending feed ramp may also be provided.

18 Claims, 7 Drawing Sheets

Fig. 11
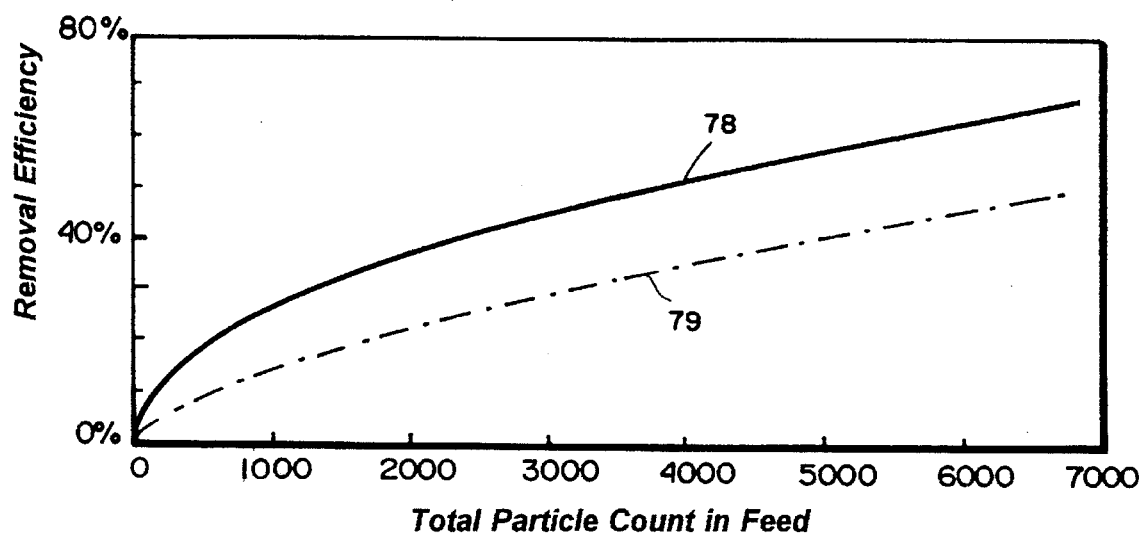
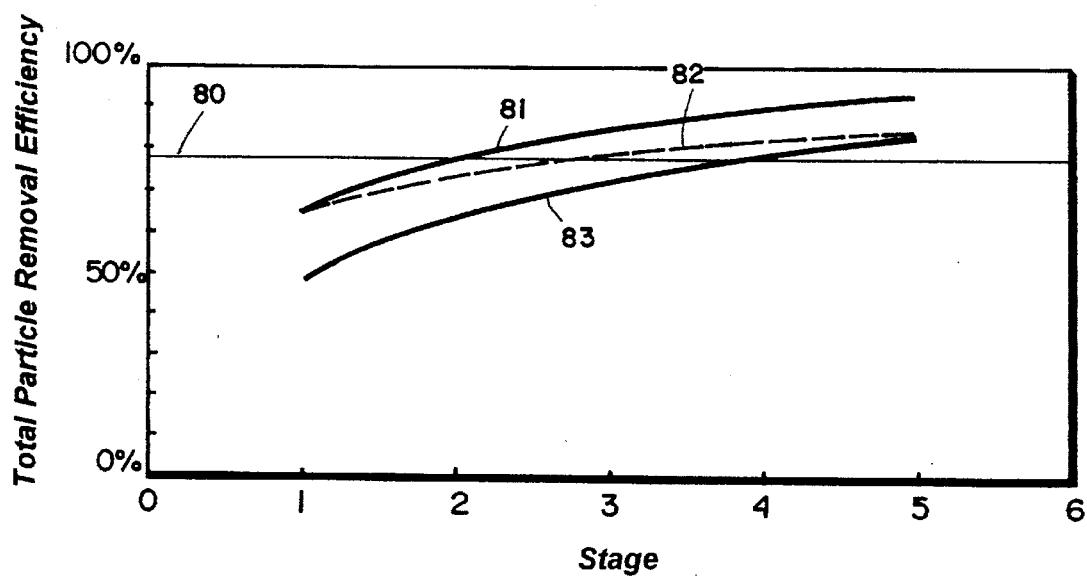
Fig. 12

AIR CONTACTOR WITH FOAM SEPARATION VESSEL SYSTEM

BACKGROUND AND SUMMARY OF THE INVENTION

In co-pending application Ser. No. 08/384,795 filed Feb. 6, 1995, now U.S. Pat. No. 5,529,190 (the disclosure of which is hereby incorporated by reference herein), a gas sparged hydrocyclone foam separation system is disclosed for use in a deinking process in the production of paper products from recycled paper. The hydrocyclone is used as a contactor rather than a deinker per se and is associated with a foam separation vessel. The present invention relates to further refinements of such a system which retains the major advantages of that system [e.g. allowing large volumes of air to be utilized without disruption of the system, for example air-to-stock ratios of between about 0.5 and 0.75:1, or even as high as about 1.5:1] while also providing a number of different modifications that facilitate commercialability of such a system and enhance its efficiency of operation, minimize floor space per unit deinking capability, and enhance ease of access and utilization.

In comparison testing of a system according to the present invention with respect to conventional froth flotation equipment, it has been found that operation of the system according to the invention is more effective. For example in tests where a single stage system according to the present invention is used before conventional froth flotation units, the system of the invention produced an average brightness gain of 3.1 ISO points at a mean solid reject rate of about 2.7%, with a total particle removal efficiency of 65% with a usable fiber reject rate of only about 0.73% of the solids fed to the stage. Reject consistency-to-feed consistency ratios typically range from 1:1 to 4:1 with a mean ratio typically being about 2:1. For example, for an average feed consistency of 1.3%, the average reject consistency is about 2.6%. When used after conventional froth flotation, a system according to the invention had an average ISO gain of about 1.7 points, with an additional 32% reduction in total particles with a solid reject rate average of about 1.7% and with a usable fiber loss average of about 0.34%. Data compiled from testing of systems according to the invention indicate that two stages of flotation utilizing the present invention will provide the equivalent performance of four conventional froth flotation cells on total particle reduction, and provide approximately 1 ISO point more brightness.

According to one aspect of the present invention a deinking system, for deinking a slurry (typically recycled paper pulp produced in a pulper such as a FIBERFLOW® Drum such as sold by Ahlstrom Kamyr of Glens Falls, N.Y., and by various subsequent treatments) is provided. The system according to the invention comprises the following components: A plurality of gas sparged hydrocyclones, each having first and second ends, a tangential slurry inlet adjacent the first end, and a slurry outlet adjacent the second end. A foam separation vessel having an outer periphery, a liquid level therein, a top, and a bottom. The plurality of gas-sparged hydrocyclones mounted around the outer periphery of the foam separation vessel. A slurry accepts outlet from adjacent the foam separation vessel bottom. A conduit connecting each of the slurry outlets of the hydrocyclones to the foam separation vessel and having a discharge opening passing through the outer periphery and below the liquid level in the foam separation vessel and above the accepts outlet of the foam separation vessel. And, means for removing foam at or above the liquid level, with ink particles and contaminants therein, from the foam separation vessel.

Each of the hydrocyclone discharge openings into the foam separation vessel outer periphery are preferably tangentially directed so as to create a bubble separation-facilitating internal rotation within the foam separation vessel. The means for removing the foam preferably comprises a rejects trough adjacent the top and outer periphery of the vessel, having a bottom that slopes to one or more drain outlets, and preferably also including a stationary or movable liquid spray head. The bottom of the rejects trough may also be helical in shape and spiral downward to a single rejects outlet. Typically, the foam separation vessel is substantially cylindrical with a substantially circular cross-section, and in that case the rejects trough is—whether outside or inside the outer periphery of the vessel—annular. The plurality of hydrocyclones are typically at least three hydrocyclones spaced substantially evenly around the foam separation vessel outer periphery. Also a substantially annular operating platform may surround the outer periphery of the vessel adjacent the top thereof, positioned to allow an operator ready access to the hydrocyclones and foam removing means. A substantially annular header surrounding the vessel outer periphery and connected to each of the hydrocyclone slurry inlets is preferably also provided. A slurry rotation breaking baffle assembly may be mounted at the slurry accepts outlet of the foam separation vessel.

Each of the hydrocyclones may be mounted at least in part by the vessel with the first end above the second end. The first end of each hydrocyclone typically includes a combination vent/foam rejects conduit, the foam rejects conduit having an outlet opening directed into the rejects trough of the vessel.

Each of the hydrocyclones may comprise an inner, gas-pervious cylinder surrounded by a solid wall cylinder defining an annular air jacket, and a single gas inlet being provided for supplying gas through the solid wall cylinder into the air jacket. The hydrocyclones are is preferably "pedestal-less", that is, it is preferred that the hydrocyclone outlet not contain a restriction such as an annular orifice The hydrocyclones also preferably include a deflector positioned in the sir jacket for causing a directed flow of gas from the single gas inlet to be dispersed in the air jacket and not directly impact the inner gas-pervious cylinder. If desired at least one conical substantially uniform back pressure generator (e.g. a pair of conical elements disposed in an hourglass-simulating relationship) may be disposed in each of the hydrocyclone slurry outlets.

The system may further comprise foam conveyance and breaking means associated with the drain outlet from the trough. Such means includes a downwardly extending outlet conduit, at least one liquid shower spray head below the trough bottom directed into the outlet conduit, and an upwardly extending vent conduit from the outlet conduit. A number of different configurations of this arrangement may be provided.

Also a foam and reject handling tank may be connected at a top portion thereof to the outlet conduit. Such a tank includes a substantially spiral downwardly extending feed ramp having an inner shoulder, an outlet from a bottom portion of the tank, and spray shower heads for spraying liquid into rejects on the ramp for breaking up foam bubbles.

According to another aspect of the present invention a deinking system is provided comprising the following components: At least one gas sparged hydrocyclone having first and second ends, a tangential slurry inlet adjacent the first end, a slurry outlet adjacent the second end, a gas-pervious inner cylinder between the first and second ends surrounded by a solid wall cylinder, defining an air jacket, and a single gas inlet for supplying gas through the solid wall cylinder into the air jacket. A foam separation vessel having a liquid level therein, a top and a bottom. A slurry accepts outlet from adjacent the foam separation vessel bottom. A conduit connecting the hydrocyclone slurry outlet to the foam separation vessel and having a discharge opening located within the outer periphery and below the liquid level in the foam separation vessel, and above the accepts outlet of the foam separation vessel. Means for removing foam at or above the liquid level, with ink particles and contaminants therein, from the foam separation vessel. And, a deflector positioned in the air jacket for causing a directed flow of gas through the single inlet to be dispersed in the air jacket and not directly impact the inner gas-pervious cylinder. It is preferred that the hydrocyclone is pedestal-less and further comprises a vent/foam rejects outlet from the first end.

The invention also relates to a gas sparged hydrocyclone comprising the following elements: A first end having a tangential slurry inlet adjacent thereto for introducing slurry with a swirling action. A second end having a slurry outlet adjacent thereto. A gas-pervious inner cylinder between the first and second ends surrounded by a solid wall cylinder, defining an air jacket. A single gas inlet for supplying gas through the solid wall cylinder into the air jacket. And, a deflector positioned in the air jacket for causing a directed flow of gas through the single inlet to be dispersed in the air jacket and not directly impact the inner air-pervious cylinder. The hydrocyclone is preferably pedestal-less, and it comprises a vent/foam rejects outlet from its first end.

The uniform back pressure generator, foam conveyance and breaking means, and foam and reject handling tank, as described above, are also novel.

It is the primary object of the present invention to provide for the effective deinking of slurry using a gas sparged hydrocyclone as a contactor, allowing highly efficient deinking compared to conventional froth flotation. This and other objects of the invention will be clear from the detailed description of the invention, and from the appended claims.

BRIEF DESCRIPTION OF THE DRAWINGS

FIG. 11 is a graphical representation of actual test results comparing removal efficiency with total particle count in the feed comparing a single stage of the system according to the invention with froth flotation equipment; and FIG. 12 is a graphical representation of overall particle removal versus the number of stages comparing the system according to the invention with conventional froth flotation cells.

DETAILED DESCRIPTION OF THE DRAWINGS

Figure 1:
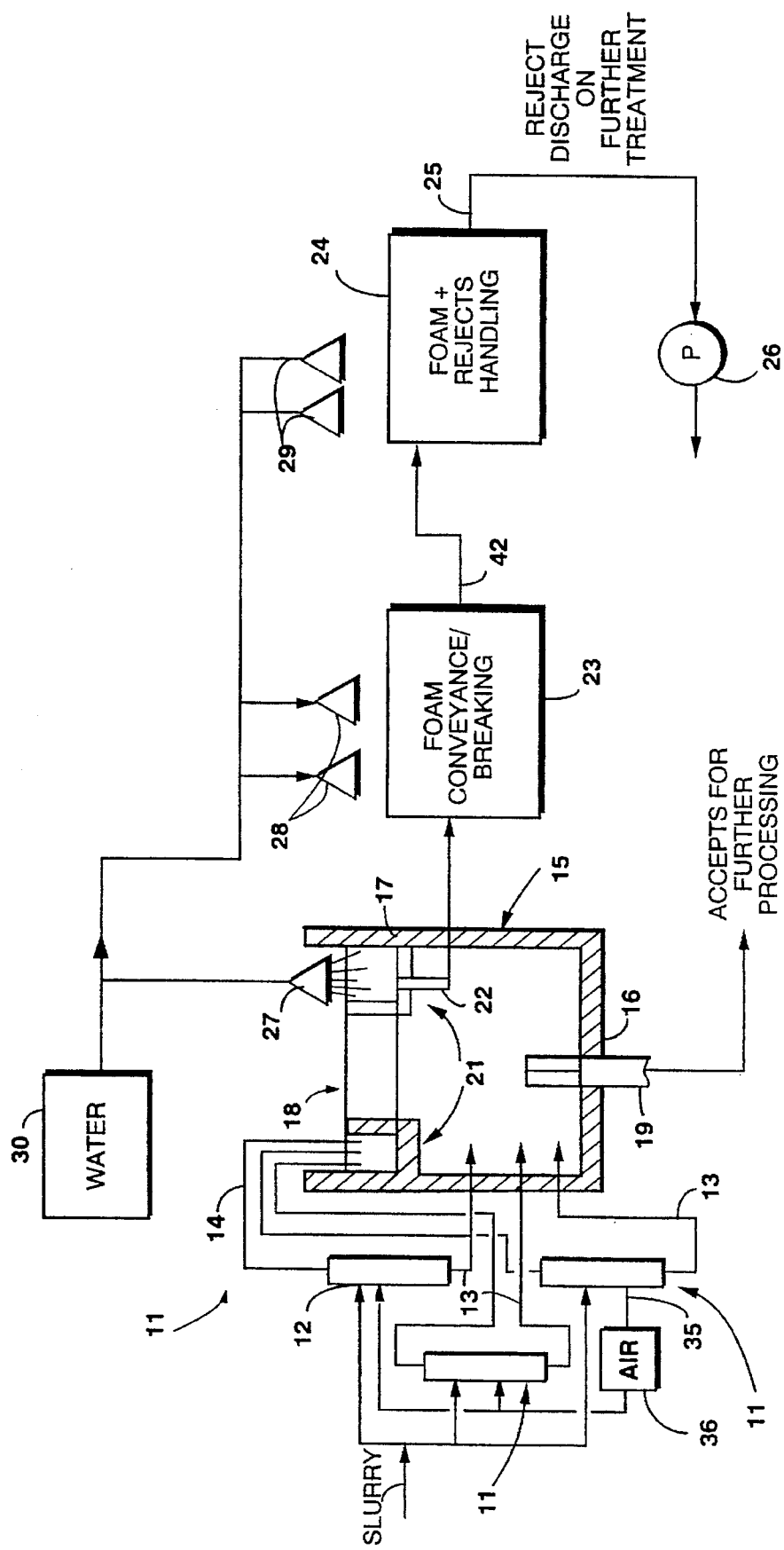
FIG. 1 is a schematic view of an exemplary system according to the present invention.

An exemplary deinking system according to the present invention is schematically illustrated in FIG. 1. It includes a plurality of gas sparged hydrocyclones 11, each including a tangential slurry inlet 12 adjacent a first end (the top in FIG. 1) thereof and a slurry outlet 13 adjacent the second end (bottom in FIG. 1) thereof, as well as an optional but preferred vent/foam rejects conduit 14 from the top thereof. The hydrocyclones 11 may be generally as disclosed in U.S. Pat. No. 5,529,190 and act as contactors rather than as deinkers per se, introducing very high ratios of gas (e.g. air to the volume of slurry). For example air to pulp ratios with the contactor 11 may easily be between about 0.5 and 0.75:1, with ratios even as high as about 1.5:1 being possible.

Connected to the slurry outlets 13 from the contactors 11 is a foam separation (typically flotation) vessel 15 having a bottom 16, outer periphery 17, top 18, and accepts outlet 19 adjacent, for example, bottom 16. Pulp having the vast majority of the foam/rejects removed therefrom passes out the accepts conduit 19 in the bottom 16, while the foam/rejects flow over the edge of an annular trough 21 to be discharged through the trough outlet 22. As illustrated schematically in FIG. 1, the outlet 22 from the trough 21 typically is associated with a foam conveyance/breaking means 23, which in turn is connected to a foam and rejects handling tank illustrated schematically at 24. The outlet 25 from the tank 24 typically is connected to an let to a pump 26, which pumps the rejects for treatment or discharge. Liquid shower heads, illustrated schematically at 27, 28, 29, for example, connected up to a source of liquid (e.g. water) 30, are associated with the various components 15, 23, 24. The consistency of the pulp in structures 11 and 15 typically is about 0.9–1.5%, e.g. averaging about 1.3%.

Figure 2:
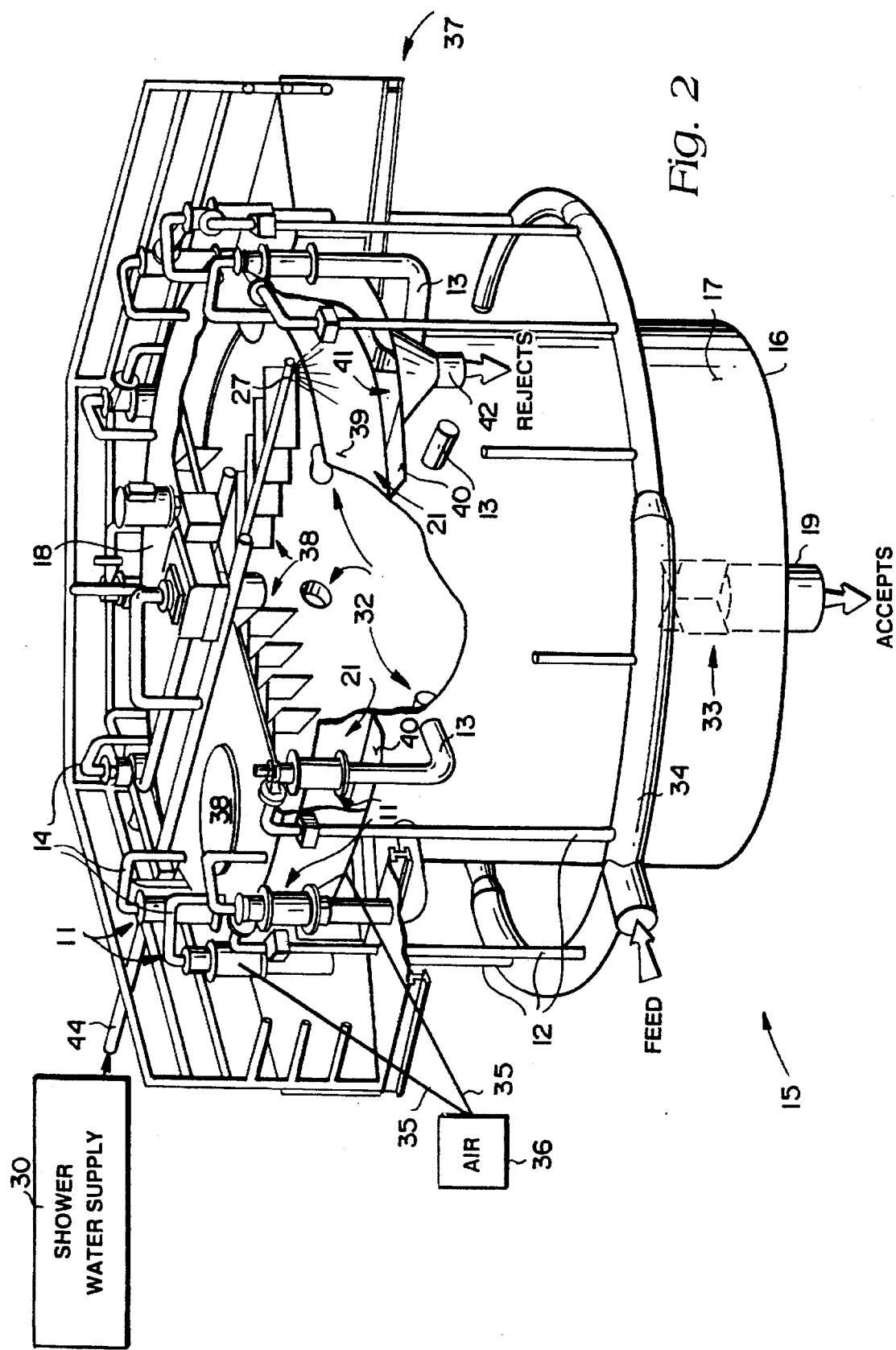
FIG. 2 is a top perspective view, with portions cut away for clarity of illustration, of a preferred embodiment of the hydrocyclone and foam separation vessel components of the system of FIG. 1.

A refined efficient design of the hydrocyclones 11 and vessel 15 is illustrated in more detail in FIG. 2. A plurality of the hydrocyclones 11 (in this case approximately twelve) are mounted generally uniformly spaced around the outer periphery 17 of the vessel 15. The hydrocyclones 11 are—in the embodiment illustrated—at least in part mounted by the vessel 15, and the accepts conduits 13 therefrom pass into the interior of the vessel 15 below the level of liquid therein, and significantly above the accepts outlet 19. As can be seen by reference numeral 32 in FIG. 2, where the conduits 13 enter the vessel 15 they are tangentially directed, so as to create a bubble separation-facilitating internal rotation of slurry. The turbulence caused by these tangential inlets 32 and associated pulp turnover and rotation, all aid in effectively separating air from pulp in the vessel 15. While the retention time provided by the vessel 15, and the turbulence zone as described above, primarily function to effectively separate air from the pulp, the vessel 15, particularly when constructed as illustrated, also thickens the rejects and controls short circuiting of aerated feed to the accepts conduit 19.

The constant upward flux of bubbles from the separation zone (where the inlets 32 open into the vessel 15) keeps a foam head in approximately the top third of the vessel 15 rising. By varying the foam layer height the reject consistency can be altered. A taller foam head allows more time for water to drain from the bubble surfaces and thus increases the al reject consistency.

Thicker rejects provide two advantages relating to water conservation. At higher reject consistencies, obviously less usable water is being rejected. This is especially important in primary stages where the rejects may be sewered. When the rejects are not sewered, it will lessen the flow load to secondary stages. Also, higher consistency foam is easier to break. The bubbles are traditionally larger and heavier and have a lower surface tension than smaller bubbles. This makes the rejected foam easier to break, and therefore decreases the mount of shower water needed to effectively collapse the foam.

The bottom portion of the vessel 15 provides additional volume for air separation, but primarily acts as a buffer zone between the turbulent separation area adjacent inlets 32 and the accepts line 19. By maintaining a level of rotating stock between the tower feed and the accepts line 19, short-circuiting of tower feed stock to the accepts is minimized.

As illustrated in dotted line at 33 in FIG. 2, preferably a slurry rotation-breaking baffle is mounted at the slurry accepts outlet 19 from the vessel 15. The baffle 33—which comprises an "X" or cross configured plates in the illustrated embodiment—serves to stop swirling action of the pulp actually at the outlet 19, allowing for better and less turbulent feed of accepts out the outlet 19.

The pulp slurry to be acted upon by the hydrocyclones 11 may—as illustrated in the preferred embodiment of FIG. 2—be fed to each of the inlet conduits 12 by a common header 34 surrounding the outer periphery 17 of the vessel 15. Air or other gas is supplied to each of the hydrocyclones via lines 35, which lines 35 may also be connected up (by any suitable header arrangement) to a common source of gas illustrated schematically at 36 in FIG. 2. Also substantially annular operating platform 37 may be mounted on tank 15 surrounding the outer periphery 17 at the top 18 of the tank 15, and positioned for ready access to the hydrocyclones 11 and other aspects of the vessel 15 as will be hereinafter described.

The top 18 is preferably closed, with one or more manholes 38 therein readily accessible from the platform 37, which manholes 38 can be opened at the top 18.

The system according to the invention also comprises means for removing foam at or above the liquid level within the vessel 15, which foam has ink particles and contaminants therein, from the vessel 15. Such foam removing means may comprise, as described in co-pending application Ser. No. 08/384,795, or otherwise contemplated, various weirs, dams, conduits, nozzles, jets or liquid sprays, mechanical elements such as the rotating bladed scraper illustrated at 38 in FIG. 2, and/or the like. Preferably such foam removing means includes the trough 21 (illustrated in both FIGS. 1 and 2), which trough 21 is—where the vessel 15 is substantially cylindrical with a substantially circular cross-section—substantially annular and associated with (either inside, outside, or over) the outer periphery 17 of the vessel 15. The inner wall 39 of the trough 21 acts like a weir, and the rotating scraper 38 moves foam—preferably high consistency foam as described above—over wall/weir 39 into the trough 21.

The trough 21 is ideally constructed so that the bottom 40 thereof slopes to one or more drain outlets, illustrated schematically at 41 in FIG. 2. The rejects then pass in an outlet conduit 42 from the drain outlet 41, for further treatment or disposal. A shower head 27 is preferably provided for directing a liquid shower on the foam in the trough 21 for breaking up the foam bubbles. The shower head 27 is, in the embodiment illustrated in FIG. 2, connected to a water supply conduit 44, and is shown as stationary. However, instead, a number of shower heads 27 may be associated with the rotating scraper 38, or otherwise rotatable, so that one or more shower heads 27 move over the trough 21, directing a spray of water therein. If the single shower head 27 illustrated is utilized it is desirably positioned as illustrated in FIG. 2, that is substantially directly over the outlet 41.

The vent/reject outlet conduits 14 from the hydrocyclones 11 are preferably bent in the generally U-shaped configuration illustrated in FIG. 2, and are positioned above the trough 21 (as also schematically illustrated in FIG. 1)—directly feeding the rejects therefrom into the trough 21. Of course it will depend upon the details of the operation of the contactors 11, and whether they use pedestals or other restrictions, as to whether or not any, or any significant amount of, rejects are discharged therefrom into the trough 21.

Figure 3:
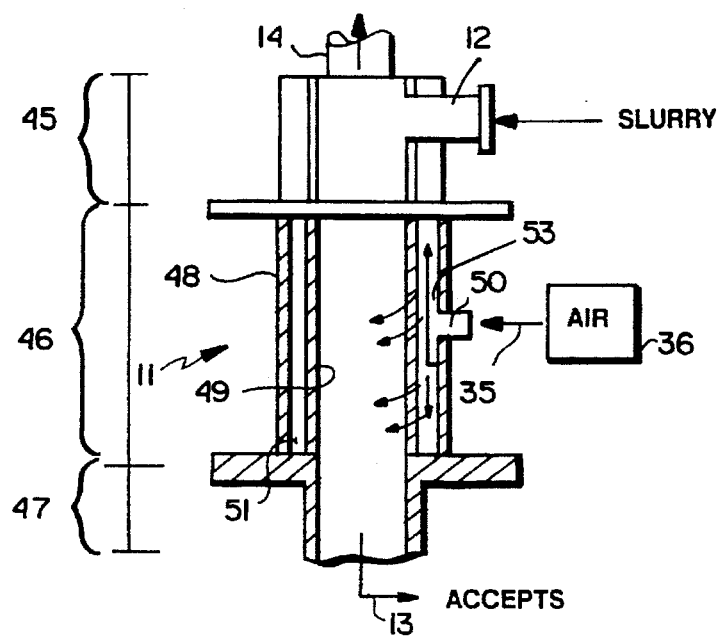
FIG. 3 is a schematic side view, partly in cross-section and partly in elevation, of an exemplary novel gas sparged hydrocyclone according to the invention, used as a contactor.

According to the present invention each of the contactors/hydrocyclones 11 may be constructed as illustrated in FIG. 3. In this embodiment, the contactor 11 include a head portion 45, a body portion 46, and an outlet portion 47, connected to the outlet 13. As is conventional the head 45 includes the tangential slurry inlet 12 and the vent/rejects outlet 14 while the body includes an outer cylinder (e.g. of 304 or 316 stainless steel or PVC plastic pipe) 48 surrounding an inner gas pervious cylinder 49, e.g. a three-eighths inch wall Porex Tecknologies Kyner Media, e.g. having a length of about 15 inches (depending upon the application). Characteristic of the contactor 11 in FIG. 3 is that there is only a single inlet 50 to the air jacket (i.e., the annular volume 51 between the cylinders 48, 49). This simplifies operation and maintenance, and lowers costs.

In order to ensure substantially uniform introduction of the gas into the jacket 51 even though there is a single radial or tangential inlet 50, preferably a deflector—illustrated schematically at 58 in FIG. 3—is provided. The deflector 58 may merely comprise a solid wall element (straight or arcuate) disposed in a position covering the straight line path of gas from the single inlet 50 toward the porous cylinder 49, and causes the gas which impacts it to be spread out substantially uniformly 360° therefrom, so that the air swirls completely within the air jacket 51, before air passes through the gas-pervious cylinder 49 into the swirling slurry vortex interior of the cylinder 49 at the body 46.

Figure 4:
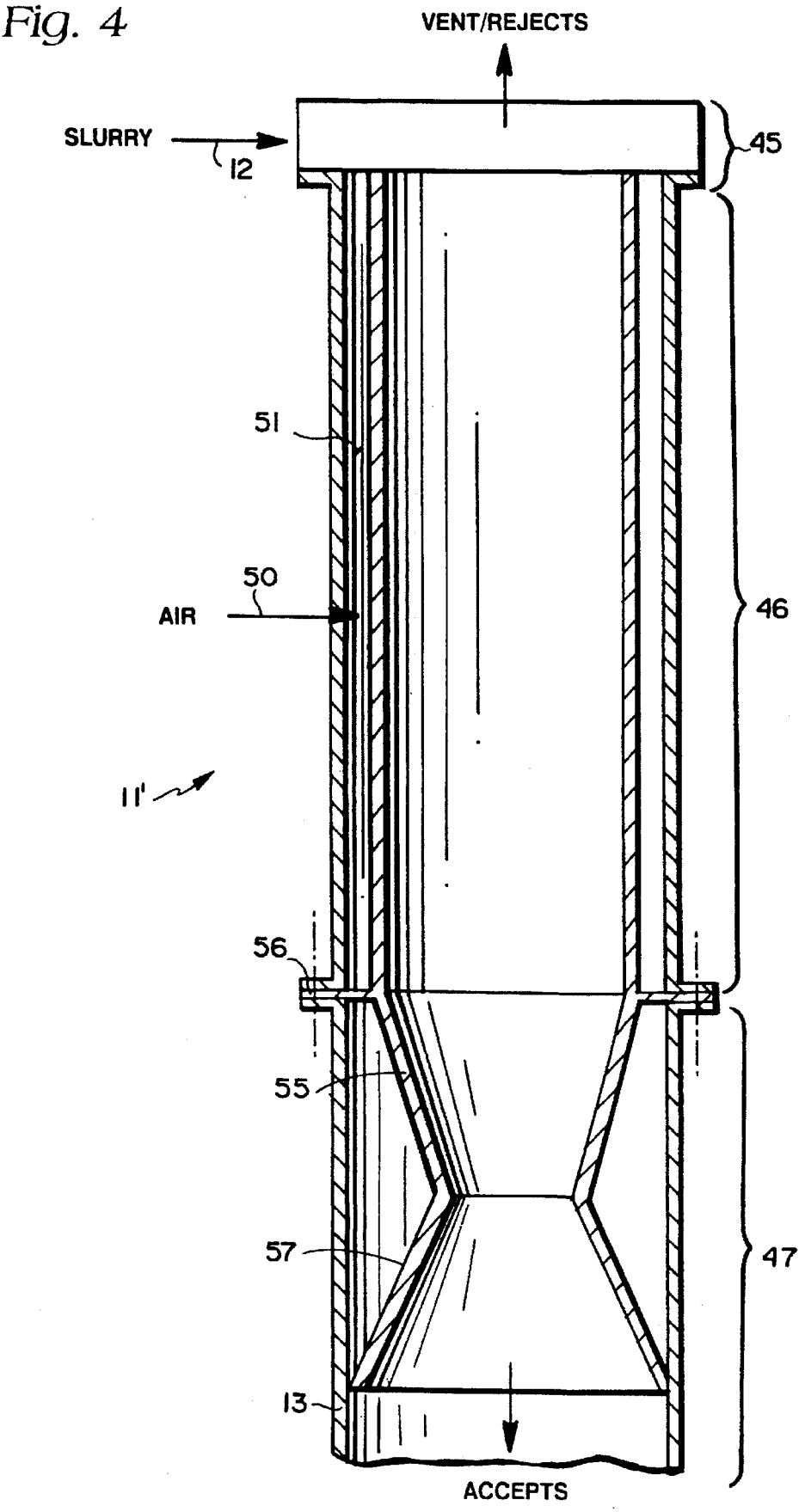
FIG. 4 is a view similar to that of FIG. 3 showing the utilization of a back pressure generator for the hydrocyclone/contactor.

FIG. 4 illustrates a modified form of contactor 11' that may be utilized according to the invention, or in other circumstances where a contactor is desired. The illustration of FIG. 4 it is even more schematic than that of FIG. 3, with like structures shown by the same reference numerals. The novel aspect of the contactor 11' is the provision of a substantially uniform back pressure generator insert 55 in the outlet portion 47 of the contactor 11' (e.g. connected to the body 46 by a conventional flange arrangement 56). The back pressure generator insert 55 is—as seen in FIG. 4—substantially conical, having a slope such that the cross-sectional area thereof gets smaller moving downwardly. The conical substantially uniform back pressure generator 55 is more desirable for circumstances where the hydrocyclone is to be used as a contactor since the pedestal which is typically used for the back pressure function creates a considerable amount of turbulence in the slurry after it leaves the hydrocyclone. While this does not affect the performance of the hydrocyclone if used as a cleaner, when used as a contactor—as in the system illustrated in the drawings—it is disadvantageous because turbulence after the contactor 11' but prior to vessel 15 breaks bubbles and therefore reentrains ink into the slurry.

Utilizing the conical back pressure generator 55, a very low reject rate (less than about 1% by volume) provides a good total dirt count cleaning efficiency for the contactor 11' as well 1–2 points of ISO brightness gain. The generator 55 is optimized for length and diameter depending upon the particular circumstances to give the desired reject rate, providing a much smoother, less turbulent transition from the contactor 11' to the vessel 15 than would a conventional pedestal. Also since a conventional pedestal is one-third the cost of an entire hydrocyclone, a considerable savings is achieved by utilizing a simple conical element 55.

A second substantially conical element 57, configured with the first 55 to provide a generally hourglass configuration, is utilized when turbulence from the contactor 11' should be completely minimized.

Figure 5:
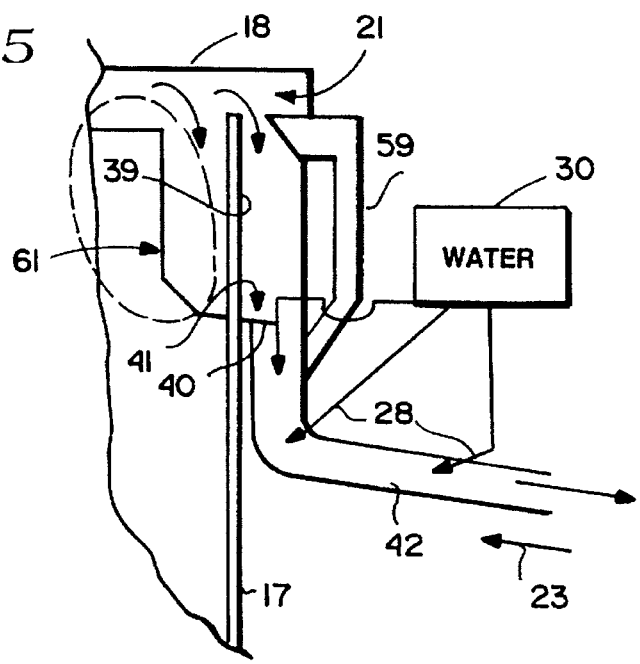
FIGS. 5 and 6 are side schematic views, partly in cross-section and partly in elevation, of two alternative embodiments of foam conveyance and breaking means according to the present invention.
Figure 6:
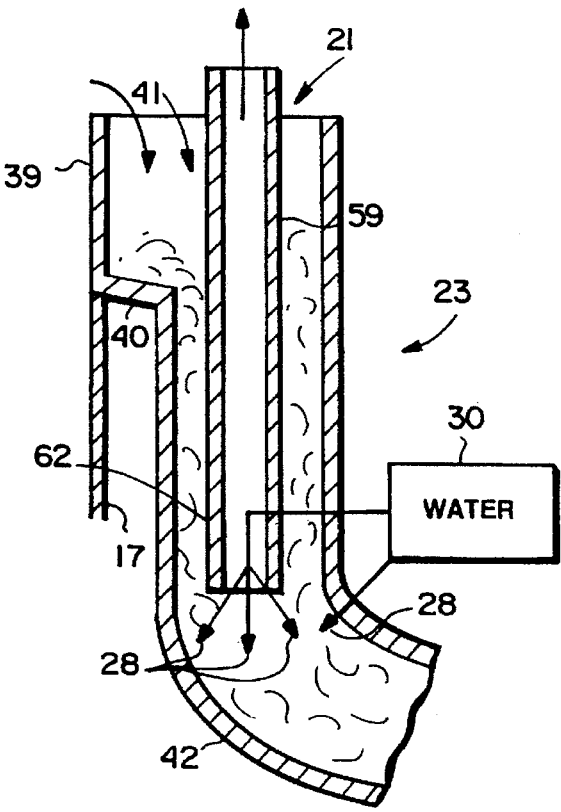

Exemplary configurations of the foam conveyance/breaking means 23 of FIG. 1 are illustrated in FIGS. 5 and 6. Structures in FIGS. 5 and 6 common to those in FIG. 2 are illustrated by the same reference numerals.

With respect to FIG. 5, in this embodiment foam overflows the inner wall 39 of the trough 21 and passes through the drain outlet 41 into the outlet conduit 42. The outlet conduit 42, of course, extends below the bottom 40 of the trough 21 and at least one spray head 28—and preferably a plurality of spray heads 28 positioned as illustrated in FIG. 5—is/are associated with the conduit 42, providing generally downwardly directed (and in the case of the lower two spray heads 28 in FIG. 5 countercurrent to the general direction of flow of the rejects in conduit 42) liquid flow to facilitate conveyance of the foam and breaking up the bubbles therein. Also a vent conduit 59 extends upwardly from the outlet conduit 42 (below the bottom 40) to allow ready venting of gas released by the breaking foam bubbles. This minimizes the amount of air carryover into the subsequent rejects tank 24.

The spray heads 28 may be stationary or rotating or otherwise movable (e.g. reciprocal), positioned in an optimum manner for both breaking and mobilizing the foam in the outlet conduit 42. The lowermost nozzles 28 in FIG. 5 continue to keep the foam broken while in the conduit 42 as well as facilitating conveyance thereof.

Shown with the dotted line circle at 61 in FIG. 5 is an alternative configuration of trough, an "internal" (of the outer periphery 17 of the vessel 15) trough, but otherwise the same as the solid line structure in FIG. 5.

FIG. 6 illustrates a modified embodiment of what is seen in FIG. 5. In FIG. 6 the same structures as in FIG. 5 are shown by the same reference numerals. The only significant difference between the embodiments is that the bottom portion 62 of the vent 59 is centrally located in the conduit 42, in fact one or more of the spray heads 28 even being provided in the bottom thereof, and the vent conduit 59 is essentially completely concentric with and extends upwardly through the drain outlet 41 from the conduit 42.

Figure 7:
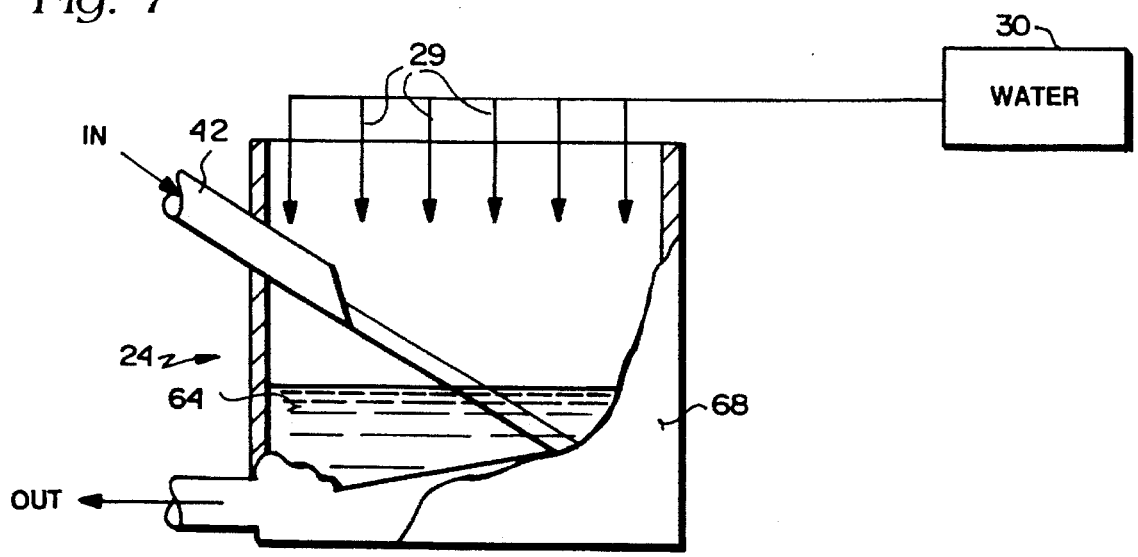
FIG. 7 is a side schematic view of an exemplary foam and reject handling tank of the system of FIG. 1.
Figure 8:
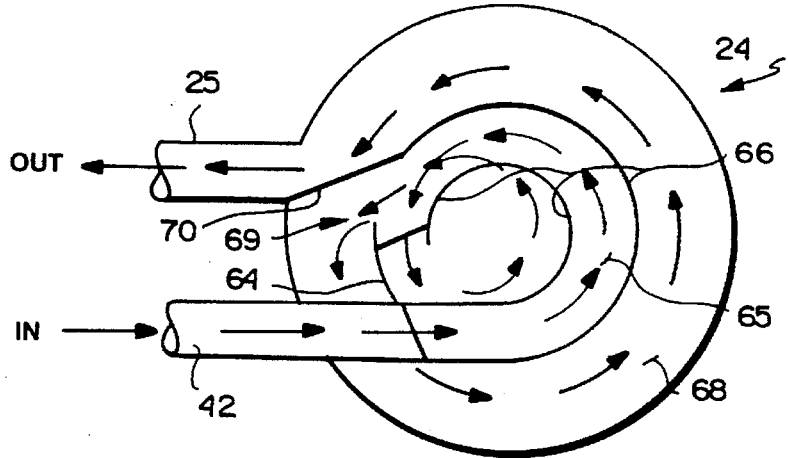
FIG. 8 is a top schematic view of the tank of FIG. 7, with the shower heads removed for clarity of illustration.

FIGS. 7 and 8 illustrate in more detail, although still schematically, an exemplary foam and rejects handling tank 24 shown in block form in FIG. 1.

The slurry in conduit 42 is introduced into an inner chamber 64 of the tank 24 utilizing a downwardly extending feed ramp 65, with a spiral configuration as illustrated most clearly in FIG. 8. Preferably the spiral ramp 65 has a shoulder or wall 66 at least on the inner portion thereof to keep the reject flow from splashing over the side thereof. A similar vertical shoulder or wail may be provided on the exterior thereof, as best seen in FIGS. 7 and 8, but the shoulder 66—if provided—need not extend the entire length of the ramp 65 but only about the first 80°–150° or so thereof. The downwardly sloping ramp keeps the slurry from splashing into the tank 24 and generating more foam by allowing the liquid in the tank 24 to seek its own level on the ramp 65. This allows the tank 24 to be run at virtually any level and still maintain a smooth transition of the feed into the outer chamber 68 of the tank 24. The bottom 69 of the ramp 65 communicates with the bottom of the outer chamber 68, a dividing wall 70 being provided thereat to prevent short circuit flow of slurry to the outlet 25. The heavier, deaerated reject flow will pass into the outer chamber 68, and then out the outlet 25. By creating an internal to external flow path, the flow will slow as it moves outwardly in the tank 24, maximizing the mount of possible air removal. The suction of the pump 26 may assist in providing a motive force pulling the slurry out of the tank 24.

As seen schematically in both FIGS. 1 and 7, a plurality of shower heads 29 are preferably provided for breaking up foam bubbles when the slurry is on the ramp 65, and even while in other portions of the inner chamber 64 or outer chamber 68. Though the flow out the outlet 25 is preferably sent directly to the suction of pump 26, recirculation flow may also be fed into the tank 24 in a manner similar to the reject flow described above. It may be possible to use the same ramp 65 for this purpose, at a lower entry level point.

Figure 9:
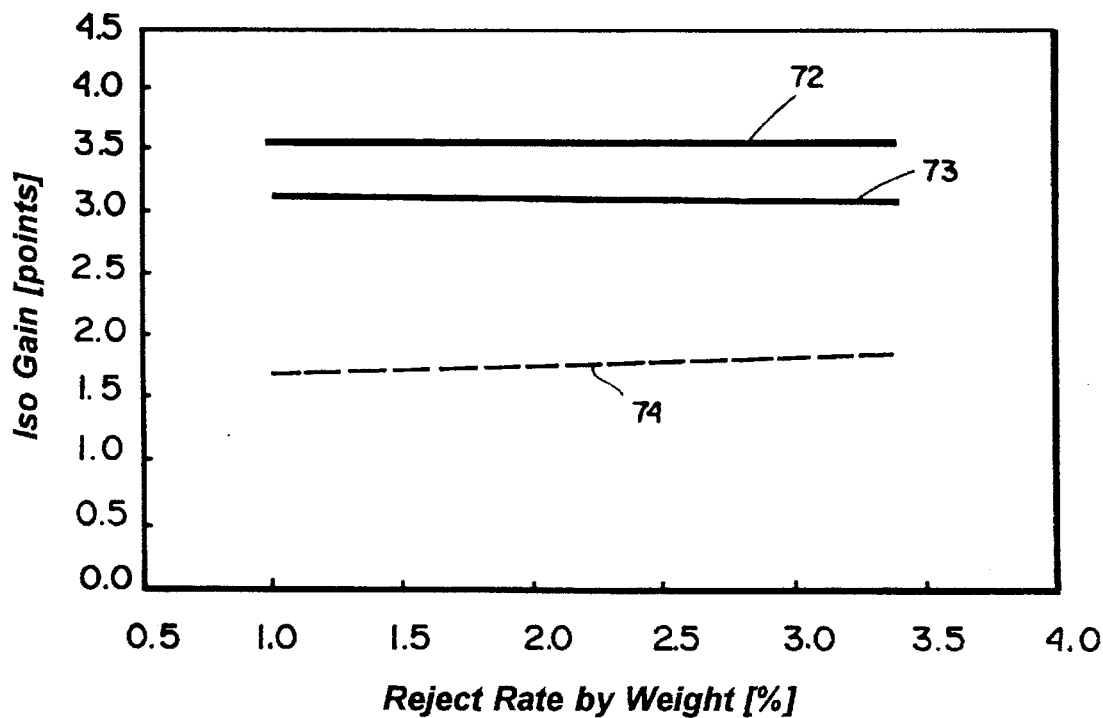
FIG. 9 is a graphical representation of actual test results showing ISO gain plotted against reject rate by weight for various stages of the system according to the invention compared to a conventional four stage froth flotation system.

FIGS. 9 through 12 schematically graphically illustrate advantages that can be achieved utilizing the system including the hydrocyclones 11 and vessel 15 such as generally illustrated in FIGS. 1 and 2 and described with respect thereto. FIG. 9 plots reject rate (by weight percent) on the X axis versus brightness gain (ISO points) on the Y axis. The line 72 illustrates a plot approximating actual tests using four stages of conventional froth flotation deinking equipment (cells), line 73 schematically illustrates the plot of actual test results showing a single stage of hydrocyclones 11 and vessel 15 (which may constructed as illustrated in FIG. 4 of co-pending application Ser. No. 08/384,795) used prior to the four conventional froth flotation cells the data for which is plotted at 72, while graph line 74 is a plot of the same system according to the invention used after the four conventional cells plotted at 72.

Figure 10:
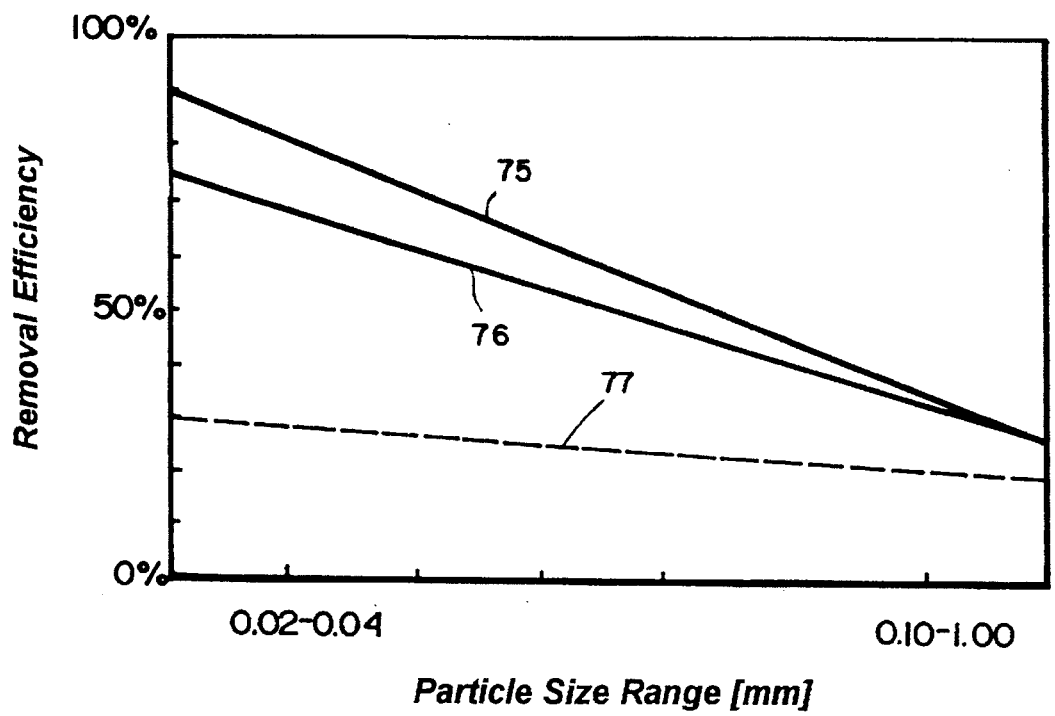
FIG. 10 is a graphical representation of removal efficiency versus particle size range with the same system configuration as in FIG. 9.

FIG. 10 plots particle removal efficiencies by size range with removal efficiency (in %) plotted on the Y axis and particle size range in millimeters on the X axis. The furnish mix utilized for these tests was 85% old news print (ONP) and 15% white, old magazine (OMG). Plot 75 illustrates the results for testing four stages of conventional flotation cells; 76, for testing one stage of a system according to the invention prior to the four cells plotted in 75; while plot 77 illustrates one stage according to the invention after the four cells plotted at 75.

FIG. 11 plots removal efficiency Y axis) as a function of particles in the feed (total particle count in feed being on the X axis). The solid line curve 78 is for the system according to the present invention, and may be represented by the equation $Y=0.0083 x^{0.4986}$. The lower curve 79 in FIG. 11 is a combined measured and calculated curve with respect to four stages of conventional flotation cells, being represented by the formula $Y=0.0014 x^{0.6633}$.

FIG. 12 plots overall particle removal versus the number of stages, the total particle removal efficiency plotted on the axis and the number of stages on the X axis. The horizontal line 80 is an estimating line. Curve 81 is based upon four stages of systems according to the invention, line 82 based upon one stage according to the invention followed by four conventional froth flotation cells, and curve 83 on four conventional flotation cells followed by one stage according to the invention. This graph, particularly as represented by line 80, estimates the two stages of flotation according to the present invention are equal to four stages of the conventional froth flotation cells used in this test as far as overall particle removal is concerned. The data in FIGS. 9 through 12 also suggest that the two stages according to the invention would achieve approximately one point more of brightness than the four conventional froth flotation cells.

The graphical results in FIGS. 9 through 12 also indicate an average brightness gain of about 3.1 ISO points at a mean solid reject rate of about 2.7% for a pre-conventional stages system according to the invention, with a total particle removal efficiency in this position of about 65% with a usable fiber reject rate of about 0.73% of the solids fed to the stage. When used after the conventional flotation cells instead of before, the average ISO gain of the stage according to the invention is about 1.7 points along with an additional about 32% reduction in total particles, with an average solid reject rate of about 1.7%, and a usable fiber loss average of about 0.34%.

It will thus be seen that according to the present invention an advantageous structure may be provided for effectively deinking pulp slurries. While the invention has been herein shown and described in what is presently conceived to be the most practical and preferred embodiment thereof it will be apparent to those of ordinary skill in the art that many modifications may be made thereof with the scope of the invention, which scope is to be accorded the broadest interpretation of the appended claims so as to encompass all equivalent systems and devices.

What is claimed is:

1. A deinking system, for deinking a slurry, comprising:
a plurality of gas sparged hydrocyclones, each having first and second ends, a tangential slurry inlet adjacent said first end, and a slurry outlet adjacent said second end;
a foam separation vessel having an outer periphery, a liquid level therein, a top, and a bottom;
said plurality of gas-sparged hydrocyclones comprising at least three hydrocyclones mounted to and spaced substantially evenly around said outer periphery of said foam separation vessel;
a slurry accepts outlet from adjacent said foam separation vessel bottom;
a conduit connecting each said slurry outlet of said hydrocyclones to said foam separation vessel and having a discharge opening passing through said outer periphery and below the liquid level in said foam separation vessel and above said accepts outlet of said foam separation vessel; and
means for removing foam at or above the liquid level, with ink particles and contaminants therein, from said foam separation vessel.

2. A deinking system as recited in claim 1 wherein each of said hydrocyclone discharge openings into said foam separation vessel outer periphery are tangentially directed with respect to said outer periphery so as to create a bubble separation-facilitating internal rotation within said foam separation vessel.

3. A deinking system as recited in claim 1 wherein said means for removing foam comprises a rejects trough adjacent the top and adjacent said outer periphery of said foam separation vessel.

4. A deinking system as recited in claim 3 wherein said rejects trough has a bottom sloping to one or more drain outlets.

5. A deinking system as recited in claim 3 wherein said rejects trough includes a liquid shower for breaking up foam bubbles in said trough.

6. A deinking system as recited in claim 3 wherein said foam separation vessel is substantially cylindrical with a substantially circular cross-section, and wherein said rejects trough is substantially annular.

7. A deinking system as recited in claim 6 further comprising a substantially annular operating platform surrounding said outer periphery of foam separation vessel adjacent said top thereof and positioned for ready access to said hydrocyclones and foam removing means.

8. A deinking system as recited in claim 6 further comprising a substantially annular header surrounding said foam separation vessel outer periphery and connected to each of said hydrocyclone slurry inlets.

9. A deinking system as recited in claim 6 wherein each of said hydrocyclone discharge openings into said foam separation vessel outer periphery are tangentially directed with respect to said outer periphery so as to create a bubble separation-facilitating internal rotation within said foam separation vessel.

10. A deinking system as recited in claim 9 further comprising a slurry rotation-breaking baffle assembly mounted at said slurry accepts outlet from said foam separation vessel.

11. A deinking system as recited in claim 1 wherein each of said hydrocyclones comprises an inner air-pervious cylinder surrounded by a solid wall cylinder, defining an annular air jacket, and a single gas inlet for supplying gas through said solid wall cylinder into said air jacket.

12. A deinking system as recited in claim 11 wherein each said hydrocyclone is pedestal-less; and further comprising a deflector positioned in said air jacket for causing a directed flow of gas from said single gas inlet to be dispersed in said air jacket and not directly impact said inner air-pervious cylinder.

13. A deinking system as recited in claim 1 further comprising at least one substantially conical substantially uniform back pressure generator disposed in each of said hydrocyclone slurry outlets.

14. A deinking system as recited in claim 13 wherein each said at least one substantially conical back pressure generator comprises a pair of substantially conical elements having the appearance of an hourglass and disposed in a said slurry outlet.

15. A deinking system as recited in claim 3 wherein each hydrocyclone is mounted at least in part by said foam separation vessel with said first end above said second end; and wherein said first end of each hydrocyclone further includes a combination vent/foam rejects conduit, said conduit having an outlet opening directed into said rejects trough.

16. A deinking system as recited in claim 4 further comprising foam conveyance and breaking means associated with said drain outlet from said trough and including a downwardly extending outlet conduit, at least one liquid shower spray head below said trough bottom directed into said outlet conduit, and an upwardly extending vent conduit from said outlet conduit.

17. A deinking system as recited in claim 16 further comprising a foam and reject handling tank connected at a top portion thereof to said outlet conduit and including a substantially spiral downwardly extending feed ramp having a shoulder; an outlet from a bottom portion of said tank; and spray shower heads for spraying liquid into rejects on said ramp or in said tank for breaking up foam bubbles.

18. A deinking system for deinking a slurry, comprising:

at least one gas sparged hydrocyclone having first and second ends, a tangential slurry inlet adjacent said first end, a slurry outlet adjacent said second end, an air-pervious inner cylinder between said first and second ends surrounded by a solid wall cylinder, defining an air jacket, and a single gas inlet for supplying gas through said solid wall cylinder into said air jacket;

a foam separation vessel having a liquid level therein, a top and a bottom;

a slurry accepts outlet from adjacent said foam separation vessel bottom;

a conduit connecting the hydrocyclone slurry outlet to said foam separation vessel and having a discharge opening located within said outer periphery and below the liquid level in said foam separation, and above said accepts outlet of said foam separation vessel;

means for removing foam at or above the liquid level, with ink particles and contaminants therein, from the foam separation vessel; and a deflector positioned in said air jacket for causing a directed flow of gas through said single inlet to be dispersed in said air jacket and not directly impact said inner air-pervious cylinder.

* * * * *